United States Patent [19]

Nicolai

[11] Patent Number: 4,553,431

[45] Date of Patent: Nov. 19, 1985

[54] DETERMINING AND INDICATING THE QUANTITY OF A STORED MATERIAL

[76] Inventor: Walter Nicolai, Maria Louisen Strasse 144, D-2000 Hamburg 60, Fed. Rep. of Germany

[21] Appl. No.: 605,500

[22] Filed: Apr. 30, 1984

Related U.S. Application Data

[62] Division of Ser. No. 424,663, Sep. 27, 1982, abandoned.

[30] Foreign Application Priority Data

Feb. 20, 1982 [DE] Fed. Rep. of Germany ....... 3206130

[51] Int. Cl.$^4$ ............................................. G01F 23/14
[52] U.S. Cl. .................................... 73/290 B; 73/149
[58] Field of Search .............. 73/290 B, 149; 318/482; 141/95; 417/297.5; 340/614

[56] References Cited

U.S. PATENT DOCUMENTS

| | | | |
|---|---|---|---|
| 2,168,106 | 8/1939 | Saur | 73/290 B |
| 2,378,849 | 6/1945 | Helleberg et al. | 73/290 B |
| 3,217,540 | 11/1965 | Talbot | 73/290 B |
| 3,385,473 | 5/1968 | Forcesi | 73/290 B |
| 3,410,222 | 11/1968 | Swanton | 137/209 |
| 3,744,306 | 7/1973 | Krueger | 73/149 |
| 4,354,383 | 10/1982 | Hartel | 73/290 B |

*Primary Examiner*—Charles Frankfort
*Assistant Examiner*—Thomas B. Will
*Attorney, Agent, or Firm*—Beveridge, De Grandi & Weilacher

[57] ABSTRACT

This invention relates to a process for determining and indicating the quantity of a stored liquid or solid material, which is contained in a closed container of constant volume together with a gaseous filling medium introduced into the residual volume of the container interior, kept under a limitedly variable pressure (overpressure or underpressure) and varying from atmospheric pressure. The residual volume or a quantity constituting a measure thereof is measured and, calibrated in units of the stored product quantity, it being reproduced by means of an analog or digital indicating device.

19 Claims, 6 Drawing Figures

DETERMINING AND INDICATING THE QUANTITY OF A STORED MATERIAL

This is a division, of application Ser. No. 424,663, filed Sept. 27, 1982, and now abandoned.

BACKGROUND OF THE INVENTION

The invention relates to determining and indicating the quantity of a stored liquid or solid product contained in a closed container of constant volume together with a gaseous or vaporous filling material filling the residual volume of the container interior and held under a limitedly variable pressure (overpressure or underpressure), varying from atmospheric pressure.

It is known to provide a gauge stick, float, pneumatic weighing appliance, etc. for determining the filling level of a liquid in a container and in this way to determine the quantity of the liquid. However, such methods and devices based on determining the filling level are dependent on the shape and position of the container, and the resulting measuring accuracy is limited. Frequently, both fixed and movable containers have a complicated three-dimensional shape, e.g. formed by pipe systems. In addition, during the journey or flight, the fuel containers of land, air and ocean craft are subject to regular position changes, and the liquid contained therein is also exposed to mass acceleration influences. It is therefore extremely important to have an accurate indication of the available liquid supply, which is independent of the shape and position of such containers, as well as of the effects of mass acceleration. However, high accuracy of measurement, independence from fault-prone mechanical filling level measuring devices, and the container shape are also important for stationary storage vessels, which do not change their position.

It is also known to determine the quantity of a stored liquid material on the basis of a flow measurement.

BRIEF SUMMARY OF THE INVENTION

The problem of the invention is to provide a process and apparatus of the aforementioned type which, with minimum effort and expenditure, permits an accurate indication of the stored product, quantity and which is independent of the shape and position of the storage container and mass acceleration.

It is known and conventional to monitor the state of sealing of closed liquid storage containers, by using an air, gas or vapour quantity which fills the residual volume of the container interior and which is kept under a pressure (overpressure or underpressure) differing from atmospheric pressure, which is measured, and an extremely fast pressure compensation, taking place via leaks which are larger than so-called natural leaks, is interpreted as an indication of an inadmissible leak state.

The invention is based on the fact that it is possible to relatively simply determine the residual volume in the storage container filled with air, gas or vapour if said filling agents are under a pressure differing from atmospheric pressure and which is varied within certain predetermined limits, assuming adequately small pressures differing from atmospheric pressure and adequately high absolute temperatures, on the basis of parameters of the gas laws, particularly Boyle's law, and that in view of the fact that the particular quantity or volume of the stored material is the difference between the constant overall volume of the container and the residual volume, the determined residual volume, or a determined quantity corresponding to the residual volume, is a measure of the particular liquid quantity in the container and can therefore be directly calibrated in units of the liquid quantity.

The problem of the invention is therefore solved in that the residual volume or a quantity corresponding thereto is measured and, calibrated in units of the stored product quantity, is reproduced by means of an analog or digital indicator.

A possibility for determining the stored product quantity according to this principle is provided, according to the invention, in that the pressure of the gaseous or vaporous filling material constantly varies between two different values $P_0$ and $P_1$, the pressure difference $|P_0-P_1|$ and pressure change capacity (pumping capacity $L_p$ or pressure compensating or pressure flow capacity $L_d$) is kept constant, and the pressure change time (pumping time $t_p$ or pressure compensating time $t_d$) is measured as the quantity corresponding to the residual volume.

According to another possibility of realizing this principle, the pressure of the gaseous or vaporous filling material constantly changes between two different values $P_0$ and $P_1$, the pressure change time (pumping time $t_p$ or pressure compensating time $t_d$) and the pressure change capacity (pumping capacity $L_p$ or pressure compensating or flow capacity $L_d$) are kept constant, and the pressure difference $|P_0-P_1|$ is measured as the quantity corresponding to the residual volume.

Such a pressure measurement can be performed both under overpressure and underpressure (compared with atmospheric pressure) of the gaseous or vaporous filling material filling the residual volume of the container. Reference is made to the following for illustrating the theoretical bases of the invention.

Assuming an adequately high absolute temperature and adequately low pressure, it applies according to Boyle's law:

$$P_0 \cdot V_0 = P_1 \cdot V_1' \qquad (1)$$

wherein:

$P_0$ and $P_1$ are two different pressure values, particularly the operating pressure values at which a pump is automatically switched on and off or automatically opens or closes a flow-through opening;

$V_0$ is the residual volume filled with the gaseous or vaporous filling material under pressure $P_0$;

$t_p$ is the pumping time during the measuring process and $t_d$ the pressure compensating time during this process;

$L_p$ is the pumping capacity;

$L_d$ is the pressure compensating or flow capacity;

$V_1'$ is a fictional volume quantity comprising volume $V_0$, increased under underpressure or reduced under overpressure by the volume $L_p \cdot t_p$ delivered during the pressure change time or by the volume $L_d \cdot t_d$ flowing through the pressure compensating opening during the pressure compensating time.

The ratio $V_1'/V_0$ is called the space filling.

Assuming that on the basis of the above definition we obtain under underpressure:

$$V_{hd\ 1}' = V_0 + L_p \cdot t_p \qquad (2)$$

or $$V_1' = V_0 + L_d \cdot t_d \qquad (3)$$

and under overpressure $$V_1' = V_0 - L_p \cdot t_p \quad (4)$$

or $$V_1' = V_0 - L_d \cdot t_d \quad (5)$$

It is established on the basis of Boyle's law that under underpressure:

$$t_p = V_o \cdot \frac{P_o - P_1}{P_1 \cdot L_p} \quad (6)$$

or $$t_d = V_o \cdot \frac{P_o - P_1}{P_1 \cdot L_d} \quad (7)$$

and under overpressure:

$$t_p = V_o \cdot \frac{P_1 - P_o}{P_1 \cdot L_p} \quad (8)$$

or $$t_d = V_o \cdot \frac{P_1 - P_o}{P_1 \cdot L_d} \quad (9)$$

It can be gathered from this that, independently of whether underpressure or overpressure prevails in the gas or vapour-filled volume above the liquid level in the container, whilst maintaining constant the pressure change capacity and the absolute value of the pressure difference, the residual volume $V_0$ is proportional to the pressure change time $t_p$ or $t_d$, and when maintaining constant the pressure change time and pressure change capacity, the residual volume $V_0$ is inversely proportional to the absolute value of the pressure difference $|P_{0\ /\ -P_1}|$, i.e. $P_0-P_1$ under underpressure and $P_1-P_0$ under overpressure.

BRIEF DESCRIPTION OF THE DRAWINGS

The invention is described in greater detail hereinafter relative to non-limitative embodiments and the attached drawings, in which.

DETAILED DESCRIPTION OF THE PREFERRED EMBODIMENTS

Figure 1:
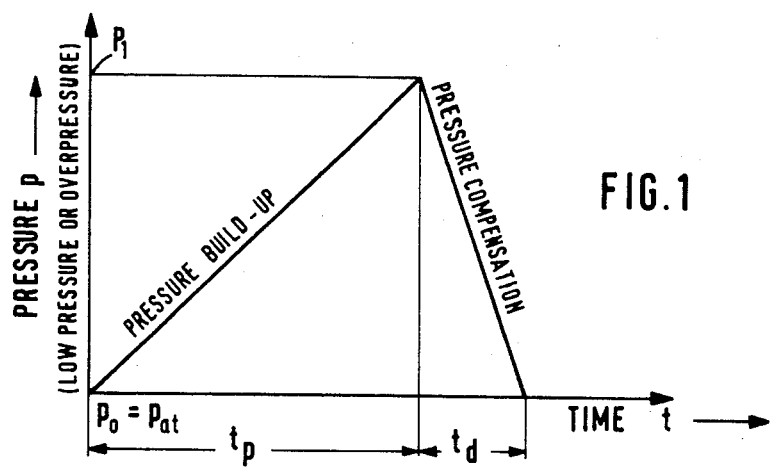
FIGS. 1 to 3 show examples of the course of the pressure P (underpressure or overpressure) in the residual volume of a container.

The pressure graph of FIG. 1 applies to the case in which e.g. the pressure P (overpressure or underpressure) of the gaseous or vaporous filling material, differing from atmospheric pressure, is produced by a periodically operating pump and is built up from a selectable value $P_0$, which in the present case is equal to atmospheric pressure $P_{at}$, to a selectable value $P_1$, which in the case of this example automatically stops the pump and initiates the pressure compensating process.

Figure 2:
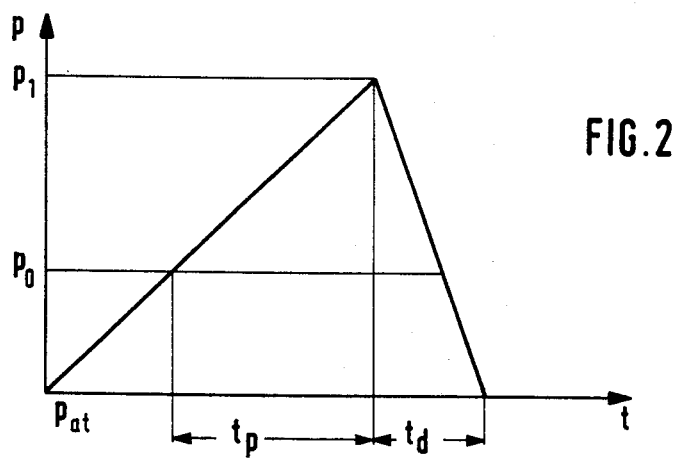

The graph of FIG. 2 applies to a device in which the selectable value $P_0$, which is e.g. between atmospheric pressure $P_{at}$, from which the varying pressure of the gaseous or vaporous filling medium is built up, and the selectable value $P_1$, at which here again the pressure build-up ends and simultaneously pressure compensation is commenced.

Figure 3:
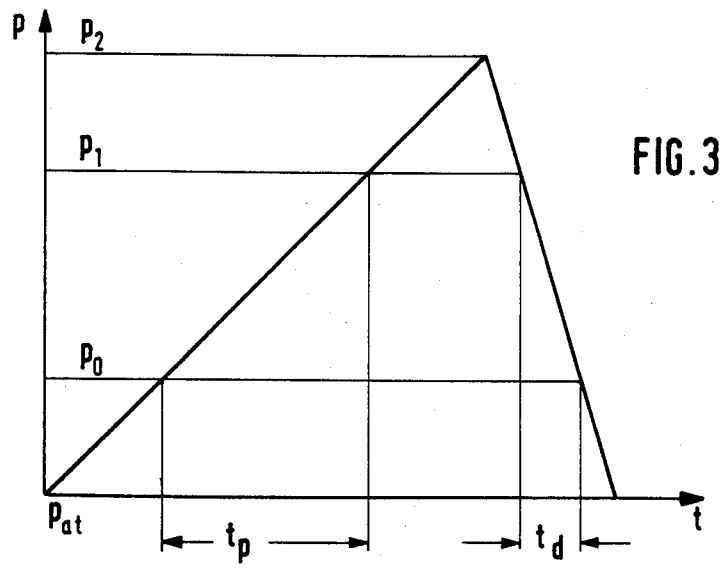

The graph of FIG. 3 applies in the case in which the selectable values $P_0$ and $P_1$ are e.g. between the atmospheric pressure $P_{at}$, from which the varying pressure of the filling medium is built up, and a selectable value $P_2$, at which the pressure build-up is automatically ended and the pressure compensation started.

In all the examples of the pressure distribution P (underpressure or overpressure) shown in FIGS. 1 to 3, according to the invention either the absolute value of the pressure difference $|P_0-P_1|$ and the pressure change capacity are kept constant while the pressure change time $t_p$ is measured during the pressure build-up (or $t_d$ during pressure compensation), or on maintaining constant $t_p$ or $t_d$, as well as the pressure change capacity, the absolute value of the pressure difference is measured. In each case, the measured value can be used as a quantity corresponding to the residual volume in the container, it being suitable as a measure of the stored product quantity because the total container volume is constant.

Fundamentally, the process according to the invention, which is explained here in connection with the determination of the quantity of a liquid stored material, can also be used for determining and indicating the quantity of material stored in solid form in a closed container, e.g. in pulverulent, lumpy or granular form.

As in all cases, the pressure change capacity should be constant throughout the measuring process, it is generally recommended to measure the pressure change time of pressure difference during a pressure compensation process, because it is relatively simple to provide a pressure compensation opening of constant throughflow capacity. If the measurement is carried out during a pressure build-up, i.e. a pumping process, it is then necessary to provide a precision pump of constant delivery in range $P_0-P_1$, which would generally involve higher expenditure. However, the constancy of the pressure change capacity is not an absolute prerequisite for the functioning of the process according to the invention.

If the measurement of the pressure change time or pressure difference is performed during a pressure compensation process, it is also possible to provide a gas cylinder with overpressure or a vacuum accumulator for producing the pressure differing from atmospheric pressure.

Figure 4:
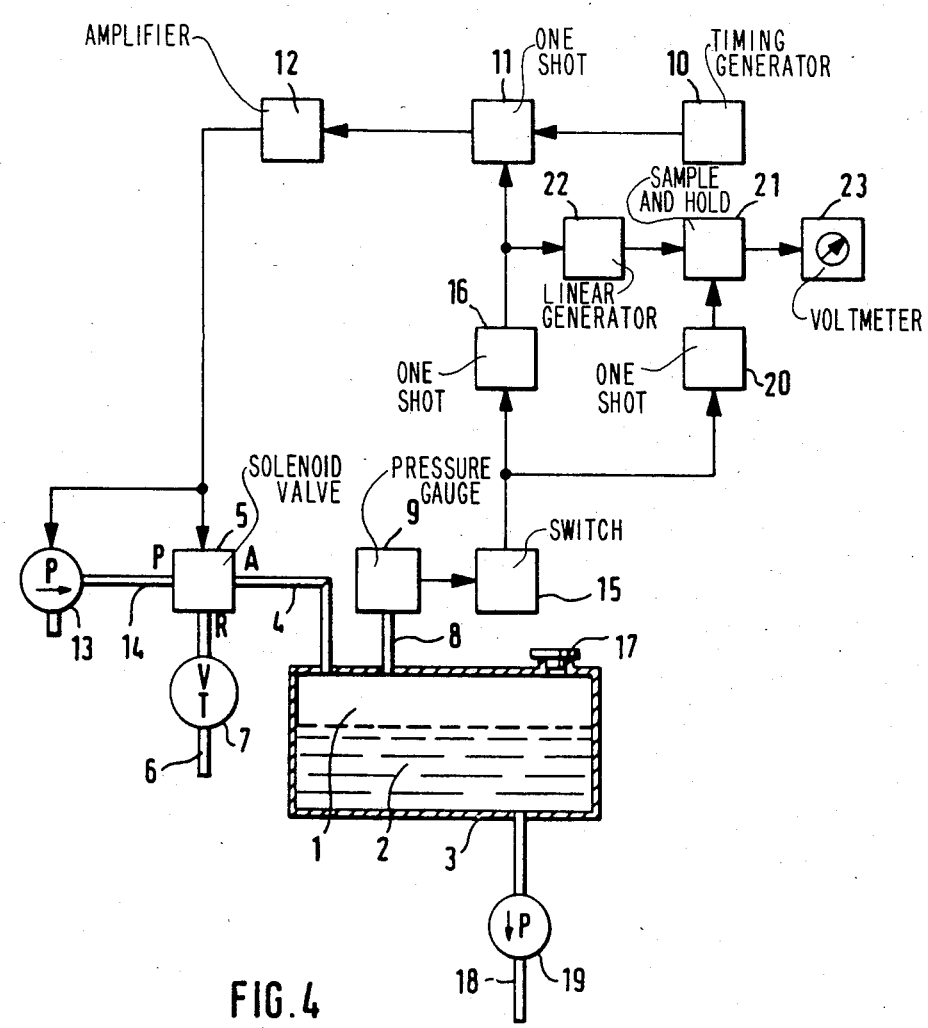
FIG. 4 is a block diagram of a device for performing the process according to the invention in the case of a constant pressure difference and measurement of the pressure compensating time $t_d$.

A number of devices for performing the process of the invention will now be described in exemplified manner. FIG. 4 shows such a device in block diagram form, the measurement of the pressure compensating time $t_d$ being carried out with a constant pressure difference and pressure change capacity in order to determine the quantity of a stored liquid material 2 in a closed container 3. After removing the gas-tight filler cap 17, the stored liquid material 2 is introduced into container 3. Stored material 2 can be removed from container 3 by means of discharge line 18, in which is incorporated a discharge pump 19. Known means, e.g. tight inlet and outlet valves on discharge pump 19 can be used to ensure that there is no disturbing gas pressure compensation via discharge pump 19. The gas space 1 of the closed container 3 filled with stored material 2 is connected to atmosphere during the measuring process and the following measuring interval via a pipe or hose line 4, the pressure compensation path A-R of the e.g. currentless three-way solenoid valve 5, which path is open in the deenergised state of the valve electromagnet, as well as pressure compensating line 6. Line 6 contains a regulatable throttle valve 7 for adjusting the throughflow capacity of the pressure compensating medium via valve path A-R of three-way valve 5. Gas space 1 is contantly connected to pressure gauge 9 via a pipe or hose line 8, and in this case the pressure gauge is in the form of a pressure-voltage converter P/U.

At the start of the pressure build-up phase, a timing signal of timing generator 10, which can be supplied either manually or periodically in automatic manner, initiates the operating state of the resettable monostable multivibrator or one-shot 11. By means of an amplifier 12, the one-shot output signal starts up pneumatic pump 13 and, accompanied by the blocking of the pressure compensation path A-R, opens the three-way valve 5 for the pressure build-up path P-A.

As a result of the operation of the pneumatic pump via pipe or hose lines 14 and 4, there is a pressure build-up in gas space 1 of container 3 from atmospheric pressure $P_0$ in direction P. As a function of the process mode, this pressure build-up can either be an overpressure or underpressure build-up. On reaching a fixed selectable pressure value $P_1$ in the course of the pressure change in gas space 1, the pressure gauge 9, i.e. the pressure - voltage converter P/U, reverses the threshold value switch 15, whose switching hysteresis corresponds e.g. to pressure difference $P_0-P_1$ and whose output at pressure $P_0$ is in the high output state. On reversing switch 15 through reaching pressure value $P_1$, a high to low signal transition occurs at the switch 15 output and brings one-shot 16 into its operating state (low output state) and consequently resets one-shot 11 before the end of its operating state. As a result, the operation of air pump 13 is interrupted, and simultaneously the three-way solenoid valve 5 is again switched back into its currentless state, where the pressure compensating path A-R is open and the pressure build-up path P-A is blocked.

The high to low signal transition of threshold value switch 15, occuring on reaching pressure value $P_1$, is also supplied to one-shot 20, which only responds to low to high signal transitions with its high output signal in the operating state. Thus, one-shot 20 is not set and remains with its low output signal in the inoperative state. Thus, the control input of the sample and hold circuit 21, which only responds to low to high signal transitions, is not controlled.

The high to low output signal transition from one-shot 16 resets one-shot 11 into its inoperative state on reaching the pressure value $P_1$ and simultaneously controls a sweep generator or integrator 22 which supplies a linear d.c. voltage at its output after each high to low control signal transition, e.g. a linear voltage which rises with time and then automatically and abruptly returns to its initial value. The resetting of generator 22 can alternatively also take place with each new control operation thereof before the start of the linear voltage rise. Sample and hold circuit 21 is connected downstream of the generator 22, so that the linear, time-rising d.c. voltage, as well as the return thereof to the initial value, is continuously present at the input of circuit 21. At the time of the switching back of the three-way solenoid valve 5 and the resulting opening of the pressure compensation path A-R, pressure compensation to the atmosphere commences in the gas space of container 3 via pressure compensating line 6 and the regulatable throttle valve 7. This pressure compensation is only ended on reaching pressure $P_0$ in gas space 1. If the pressure $P_0$ is applied to pressure gauge 9, due to its switching hysteresis threshold value switch 15 is switched back into its initial state and leads to a low to high signal transition at its output, which triggers one-shot 20. The very short low to high to low output signal of one-shot 20 is fed to the interrogation and storage instruction input of sample and hold circuit 21. The latter switches in known manner for a short interrogation time, whose length can be e.g. 100 µs, to interrogate the linear, time-rising output voltage of sweep generator 22 and determines and stores the instantaneous voltage value for generator two at this time. The voltmeter 23, connected downstream of the instantaneous value store 21, indicates the stored d.c. voltage value as a measure of the residual volume or volume conditions of stored material 2 and gas space 1. It can therefore be calibrated in stored product volume units, e.g. liters.

Figure 5:
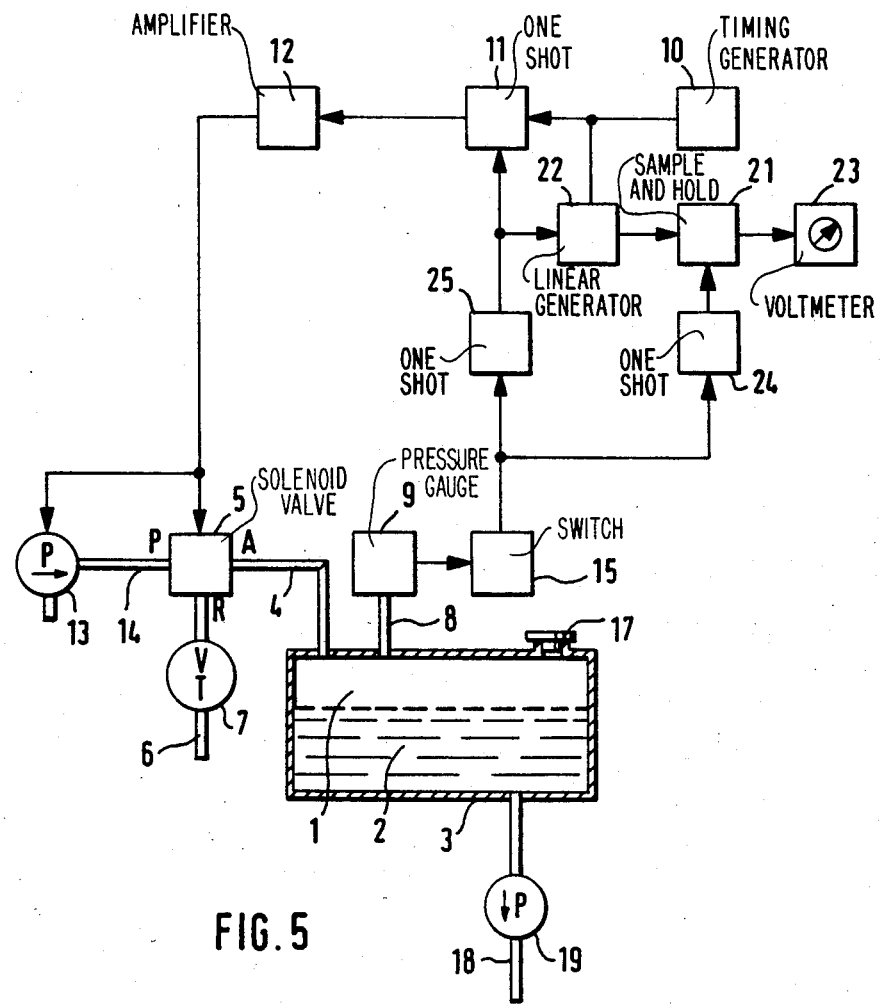
FIG. 5 is a similar block diagram when maintaining constant the pressure difference and measurement of the pressure build-up time $t_p$.

In the case of the device illustrated by the block diagram of FIG. 5, the pressure build-up time $t_p$ is measured during the pressure build-up from $P_0$ to $P_1$ to determine and indicate the stored product quantity. The components of FIG. 5 are largely the same as those of FIG. 4 and, as far as possible, have the same reference numerals. However, the regulatable throttle valve 7, for setting the through-flow capacity in the case of pressure compensation via valve path A-R, lacks any special significance in connection with the embodiment of FIG. 5.

At the start of the pressure build-up phase, a high to low to high transition signal from timing generator 10, which can be switched manually or automatically in periodic manner, initiates operation of the resettable one-shot 11, whose output signal starts the pneumatic pump 13 via amplifier 12 and, accompanied by the simultaneous blocking of the pressure compensation path A-R, also opens the three-way solenoid valve 5 for the pressure build-up path P-A.

The timing signal of timing generator 10 simultaneously controls the sweep generator 22 which, after each high to low transition at its output, supplies a linear d.c. voltage, which e.g. rises with time and then automatically abruptly drops to the initial value. The sample and hold circuit 21 is connected downstream of generator 22, so that the linear, time-rising d.c. voltage, as well as its drop to the initial value, continuously appears at the input of circuit 21.

Through the operation of pneumatic pump 13, via pipe or hose lines 14, 4, there is a pressure build-up in gas space 1 of container 3 from atmospheric $P_0$ in the direction P. As a function of the choice of process mode, this pressure build-up can be either an underpressure or overpressure build-up. When, during the pressure change in gas space 1, the fixed selectable pressure value $P_1$ is reached, pressure gauge 9 (pressure - voltage converter P/U) switches the threshold switch 15, whose switching hysteresis corresponds e.g. to the spacing of values $P_0$–$P_1$ and whose output is in the high state at pressure $P_0$, to a low state.

The high to low transition of threshold value switch 15 supplied on reaching pressure value $P_1$, sets the one-shot 24, which only responds to high to low signal transitions and at whose output there is now a very short low to high to low transitions which is supplied to the interrogation and storage instruction input of sample and hold circuit 21. In known manner, the latter switches for a short interrogation time (e.g. 100 μs) to sample the output voltage of sweep generator 22 during the linear, time-rising d.c. voltage phase and in this way determines and stores instantaneous the voltage value prevailing at this time. The voltmeter 23, connected downstream of circuit 21, indicates the stored d.c. voltage value as a measure of the residual volume in gas space 1, or the volume conditions of stored material 2 and gas space 1, and can therefore be calibrated in volume units of the stored material, e.g. liters.

The high to low signal transition produced at the output of switch 15, and reaching pressure value $P_1$ on reversing of said switch, also sets one-shot 25 which is provided with a cut-in delay of its operating state. The high to low to high output signal of one-shot 25 resets, after a delay, one-shot 11 before the end of its operating state. As a result, the operation of the pneumatic pump 13 is interrupted and simultaneously three-way solenoid valve 5 is switched back into the currentless state, i.e. the pressure compensation path A-R is open and the pressure build-up path P-A blocked.

The delay of the release of the resetting signal for one-shot 11 should be greater than the output signal duration of one-shot 24 in order to reliably avoid interrogation errors by sample and hold circuit 21 in the vicinity of pressure value $P_1$. However, for the inventive function of this device, the delay of the resetting of one-shot 11 has no particular significance.

At the time of resetting the three-way solenoid valve 5 at pressure $P_1$ and the resulting opening of the pressure compensation path A-R, pressure compensation with the atmosphere commences in gas space 1 of container 3 via pressure compensation line 6 and the regulatable throttle valve 7, and this ends on reaching pressure $P_0$ in gas space 1. If there is pressure $P_0$ at pressure gauge 9, due to its switching hysteresis the threshold value switch 15 is returned to its high state.

Figure 6:
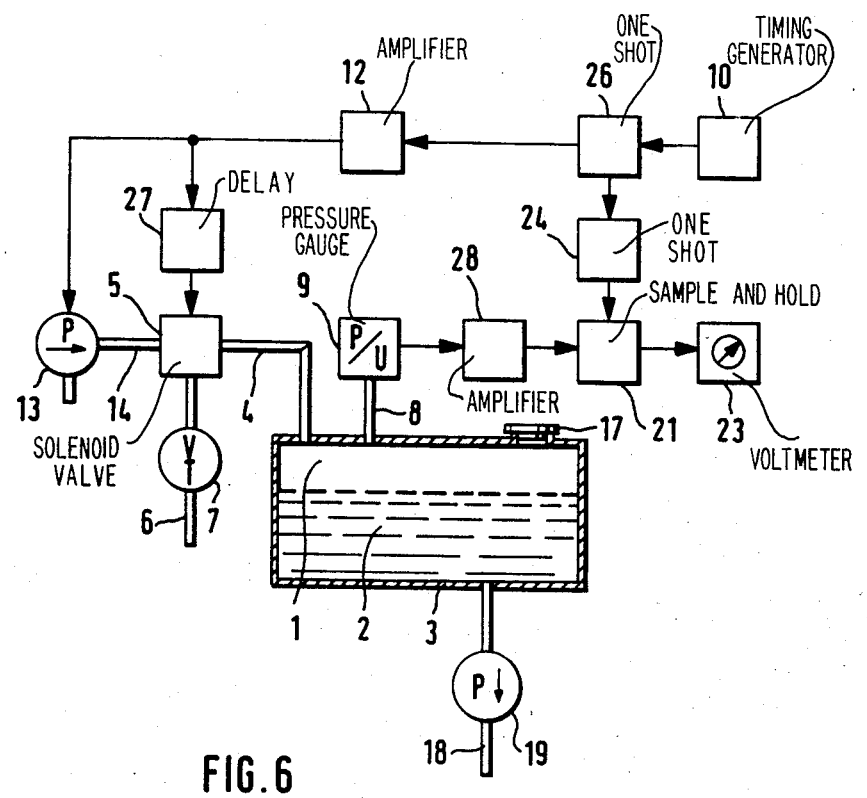
FIG. 6 is a similar block diagram when maintaining constant the pressure change time and measuring the pressure difference $|P_1-P_0|$ as a measure of the residual volume and consequently the stored product quantity.

In the embodiment of the device for determining and indicating a quantity of liquid stored material in a closed container according to FIG. 6, the measurement of the pressure difference $P_0$–$P_1$ takes place during the pressure build-up in the gas space of the container with a fixed set pumping time. To the extent the block diagram of FIG. 6 corresponds with those of FIGS. 4 and 5, the same reference numerals are used. However, in the embodiment of FIG. 6, the electric output of pressure gauge 9, which is formed by the pressure - voltage converter P/U and which supplies the pressure information, is connected via an amplifier 28 to the input of the sample and hold circuit 21.

At the start of the pressure build-up phase, a high to low to high signal from timing generator 10, which can be manually or automatically periodically switched in freely selectable time intervals, initiates the operating state of one-shot 26, whose output signal starts up the pneumatic pump 13 via amplifier 12 and, accompanied by the simultaneous blocking of the pressure compensation path A-R, opens the three-way solenoid valve 5 for the pressure build-up path P-A.

The cut-out delay element 27 located in the line between amplifier 12 and solenoid valve 5 brings about no delay of the switching process for opening the solenoid valve 5 for the pressure build-up path P-A.

During operation, via pipe or hose lines 14 and 4, pneumatic pump 13 brings about a pressure build-up in gas space 1 of container 3 from atmospheric pressure $P_0$ in direction P. As a function of the process mode choice, this pressure build-up can be an overpressure or underpressure build-up.

At the end of the freely selectable, fixed set duration of the operating state of one-shot 26 the operation of pneumatic pump 13 is interrupted and the three-way solenoid valve 5 is switched back into the currentless state delayed briefly, e.g. approximately 500 ms, by the cut-out delay element 27. This means that the pressure compensation path A-R is open again and the pressure build-up path P-A is closed. The cut-out delay element 27 only has the function of delaying the switching over of solenoid valve 5 after the stoppage of pneumatic pump 13 until the interrogation process of sample and hold circuit 21 is ended, in order to avoid any possible pressure value interrogation errors. For the function of the present device, the cut-out delay of solenoid valve 5 lacks any particular significance.

The high to low signal transition from one-shot 26 at the end of its operating state sets one-shot 24, which only responds to high to low signal transitions and leads to a very short low to high to low signal at its output. This very short signal of one-shot 24 is fed to the interrogation and storage instruction input of sample and hold circuit 21 which, in known manner, is switched for a short interrogation time (e.g. for 100 μs) to the output voltage of the amplifier 28, connected downstream of pressure gauge 9, and consequently determines and stores the instantaneous voltage value prevailing at this time. The voltmeter 23 connected downstream of circuit 21 shows the stored d.c. voltage value at the end of the pressure build-up phase, which is an equivalent measure of the measured pressure difference $P_0$–$P_1$ and consequently corresponds to the residual volume or the volume conditions of the stored material 2 and gas space 1. Thus, the voltmeter can be calibrated in the volume units of the stored material, e.g. liters.

At the time of the switching back of the three-way solenoid valve 5 taking place at pressure $P_1$ and the resulting opening of the pressure compensation path A-R, a pressure compensation to the atmosphere commences in gas space 1 of container 3 via pressure compensation line 6 and the regulatable throttle valve 7. This pressure compensation is only terminated on reaching pressure $P_0$ in gas space 1.

For reasons of simplicity in the embodiments of FIGS. 4, 5 and 6, identical measuring, evaluation and indication systems are used, e.g. sweep generators, threshold value switches, sample and hold circuits analog voltmeters, etc. However, it is also possible to use the corresponding elements of digital technology, e.g. analog/digital converters, microprocessors, counter circuits, semiconductor stores, etc.

The timing generator 10 can e.g. be an astable multivibrator, some other type of simply integrated timing generator with or without quartz stabilization, as well as a bounce-free, manually operable switch.

Instead of using the pneumatic pump for building up the pressure in the gas space of the container in an intermittent manner, together with a three-way valve for reversing the pressure build-up and compensation path, it is also possible to use a continuously running pneumatic pump, which is fixable and connected to the container gas space, in conjunction with a controllable through-way valve, e.g. a two way solenoid valve, arranged between the gas space and atmosphere, which is closed during pressure build-up and open during pressure compensation. Admittedly, during measurements during the pressure compensation, the delivery of the permanently running pneumatic pump acts counter to the pressure compensation, but this does not really impair the measurement.

In connection with the embodiments of FIGS. 4, 5 and 6, it must be borne in mind that the spacings of the timing signals of timing generator 10 are selected in such a way that, based on the measurement of an unfilled container, the operating states of all the one-shots referred to in connection therewith, as well as the sweep generator 22 have ended, before the next timing signal of generator 10 is supplied.

The possible ways of implementing the invention are not limited to those described and represented herein. Further possibilities for determining the stored product quantity according to the invention principle e.g. involve measuring the delivery capacity during the pressure build-up or the through-flow capacity during the pressure compensation, whilst maintaining the pressure difference and pressure change time constant, as the quantity representing a measure of the residual volume. If necessary, undesired temperature influences can be eliminated by measuring the temperature in the residual volume and feeding it as a correction quantity into the device performing the process.

The subtraction of the container volume and residual volume for determining the stored product quantity can take place e.g. by means of differential amplifiers, various subtracting circuit or similarly acting electric networks.

In place of the above-described sweep generators or integrators, it is possible to use add - subtract counters for determining the residual volume or stored product quantity, the start and finish of counting being in each case linked with the time of measuring the values $P_0$-$P_1$ of the pressure change measuring section.

What is claimed is:

1. Apparatus for determining and indicating the quantity of a stored liquid or solid product contained in a closed container of constant volume together with a gaseous or vaporous filling material filling the residual volume of the container interior and held under a limitedly variable pressure said residual volume serving as a measure of the quantity of the product stored in said container, said apparatus comprising:
   a pressure to voltage converter connected to said residual volume for generating a voltage signal indicative of the pressure in said residual volume;
   voltage responsive switching means connected to said converter and adapted to assume a first switching state when said converter voltage signal indicates the pressure within said residual volume is below a first preset value and to assume a second switching state when said converter voltage signal indicates the pressure within said residual volume is above a second preset value;
   pneumatic source means having an automatic switch-on and switch-off control;
   means defining a pressure compensation path between the residual volume and a reference pressure location;
   a controllable valve adapted to assume a first value state in which said pressure compensation path is blocked and to assume a second value state in which said pressure compensation path is open;
   control means for causing said valve to assume the first value state and switching on said pneumatic source means and for subsequently causing said valve to assume the second value state and switching off said pneumatic source means; and
   means responsive to operation of said control means for indicating the pressure within said residual volume.

2. Apparatus as claimed in claim 1 in which said reference pressure location is a location at ambient atmospheric pressure.

3. Apparatus as claimed in claim 1 in which said control means comprises a time dependent switch-on control and a pressure dependent switch-off control.

4. Apparatus as claimed in claim 1 in which said control means comprises a time dependent switch-on control and a time dependent switch-off control.

5. Apparatus as claimed in claim 3 in which said control means comprises means operable upon switching on of said pneumatic source means for operating said controllable valve to block the pressure compensation path and means operable upon the pressure in the residual volume reaching a preset value $P_1$ for operating said controllable valve to open the pressure compensation path.

6. Apparatus as claimed in claim 1 in which said pressure indicating means comprises a linear generator; means operable upon switching on of said pneumatic source means for activating said linear generator to generate a linearly increasing value; means operable upon the pressure in the residual volume reaching the preset value $P_1$ for sampling and storing the instantaneous value of the increasing value and then resetting said linear generator; and means for indicating the stored value as an indication of the quantity of stored product.

7. Apparatus as claimed in claim 6 in which said linear generator is a sweep generator which generates a linearly increasing voltage.

8. Apparatus as claimed in claim 6 in which said linear generator is a digital counting circuit which generates a linearly increasing count signal.

9. Apparatus as claimed in claim 4 in which said control means comprises a timer for providing turn-on signals to said switch on control and turn-off signals to said switch off control.

10. Apparatus as claimed in claim 9 in which said control means further comprises means operable upon switching on of said pneumatic means for operating said controllable valve to block the pressure compensation path and means operable upon switching off of said pneumatic means for operating said controllable valve to open the pressure compensation path.

11. Apparatus as claimed in claim 10 in which said pressure indicating means comprises a linear generator; means operable upon switching on of said pneumatic source means for activating said linear generator to generate a linearly increasing value; means operable upon switching off of said pneumatic source means for sampling and storing the instantaneous value of the increasing value and then resetting said linear generator; and means for indicating the stored value as an indication of the quantity of stored product.

12. Apparatus as claimed in claim 11 in which said linear generator is a sweep generator which generates a linearly increasing voltage.

13. Apparatus as claimed in claim 11 in which said linear generator is a digital counting circuit which generates a linearly increasing count signal.

14. Apparatus for determining and indicating the quantity of a stored liquid or solid product contained in a closed container of constant volume together with a gaseous or vaporous filling material filling the residual volume of the container interior and held under a limitedly variable pressure, said residual volume serving as a measure of the quantity of the product stored in said container, said apparatus comprising:
- a pneumatic source pump, having an automatic switch-on and switch-off control;
- means defining a pressure compensation path between the residual volume and a reference pressure location;
- a controllable valve for blocking and opening said pressure compensation path;
- means operable upon switching on of said pneumatic source pump for operating said controllable valve to block the pressure compensation path;
- means operable upon the pressure in the residual volume reaching a preset value $P_1$ for operating said controllable valve to open the pressure compensation path;
- a linear generator;
- means operable upon switching on of said pneumatic source pump for activating said linear generator to generate a linearly increasing value;
- means operable upon the pressure in the residual volume reaching the preset value $P_1$ for sampling and storing the instantaneous value of the increasing value and then resetting said linear generator; and
- means for indicating the stored value as an indication of the quantity of stored product.

15. Apparatus as claimed in claim 14 in which said linear generator is a sweep generator which generates a linearly increasing voltage.

16. Apparatus as claimed in claim 14 in which said linear generator is a digital counting circuit which generates a linearly increasing count signal.

17. Apparatus for determining and indicating the quantity of a stored liquid or solid product contained in a closed container of constant volume together with a gaseous or vaporous filling material filling the residual volume of the container interior and held under a limitedly variable pressure, said residual volume serving as a measure of the quantity of the product stored in said container, said apparatus comprising:
- a pneumatic source pump, having an automatic time dependent switch-on control and switch-off control;
- means defining a pressure compensation path between the residual volume and a reference pressure location;
- a controllable valve for blocking and opening said pressure compensation path;
- a timer for providing turn-on signals to said switch on control and turn-off signals to said switch off control;
- means operable upon switching on of said pneumatic pump for operating said controllable valve to block the pressure compensation path;
- means operable upon switching off of said pneumatic pump for operating said controllable valve to open the pressure compensation path;
- a linear generator;
- means operable upon switching on of said pneumatic source pump for activating said linear generator to generate a linearly increasing value;
- means operable upon switching off of said pneumatic source pump for sampling and storing the instantaneous value of the increasing value and then resetting said linear generator; and
- means for indicating the stored value as an indication of the quantity of stored product.

18. Apparatus as claimed in claim 17 in which said linear generator is a sweep generator which generates a linearly increasing voltage.

19. Apparatus as claimed in claim 17 in which said linear generator is a digital counting circuit which generates a linearly increasing count signal.

* * * * *